United States Patent
Wertheim

(10) Patent No.: US 6,269,372 B1
(45) Date of Patent: Jul. 31, 2001

(54) METHOD FOR REQUESTING A DATE WITH A DRIVER OF A VEHICLE SPOTTED, VIA THE LICENSE PLATE NUMBER OF THE VEHICLE

(75) Inventor: Gary D. Wertheim, 314 Oakwood Rd., Port Jefferson, NY (US) 11777

(73) Assignee: Gary D. Wertheim, Port Jefferson, NY (US)

( * ) Notice: Subject to any disclaimer, the term of this patent is extended or adjusted under 35 U.S.C. 154(b) by 0 days.

(21) Appl. No.: 09/192,144

(22) Filed: Nov. 14, 1998

(51) Int. Cl.⁷ ................................................. G06F 15/00
(52) U.S. Cl. ................................................. 707/10; 705/1
(58) Field of Search ........................... 705/1; 707/1, 5, 707/101, 3, 102, 104, 513

(56) References Cited

U.S. PATENT DOCUMENTS

| | | | |
|---|---|---|---|
| 5,659,730 | * | 8/1997 | Kelley et al. .......................... 395/603 |
| 5,778,367 | * | 7/1998 | Wesinger, Jr. et al. ................. 707/10 |
| 5,920,845 | * | 7/1999 | Risemberg ............................... 705/1 |
| 5,950,200 | * | 9/1999 | Sudai et al. ............................. 707/9 |
| 5,963,951 | * | 10/1999 | Collins ................................. 707/102 |
| 6,061,681 | * | 5/2000 | Collins ..................................... 707/5 |
| 6,092,053 | * | 7/2000 | Boesch et al. ......................... 705/26 |

* cited by examiner

*Primary Examiner*—John Breene
*Assistant Examiner*—Khanh Pham

(57) ABSTRACT

A method for requesting a date with a driver of a vehicle spotted having a license plate number, via the license plate number of the vehicle. The method includes the steps of registering for a "PLATEDATE"™ database, creating a profile on the "PLATEDATE"™ database including license plate number, state vehicle is registered in, and E-mail address, spotting the vehicle whose driver you wish to date, accessing the "PLATEDATE"™ database, inputting required information including the license plate number of the vehicle spotted, state the vehicle spotted is registered in, license plate number of vehicle of inquirer, and state of the vehicle of the inquirer is registered in, comparing the required information inputted to the "PLATEDATE"™ database, sending the message to E-mail address of the driver of the vehicle spotted, if comparing step indicates a match, and creating an E-mail account, if comparing step indicates no match.

9 Claims, 30 Drawing Sheets

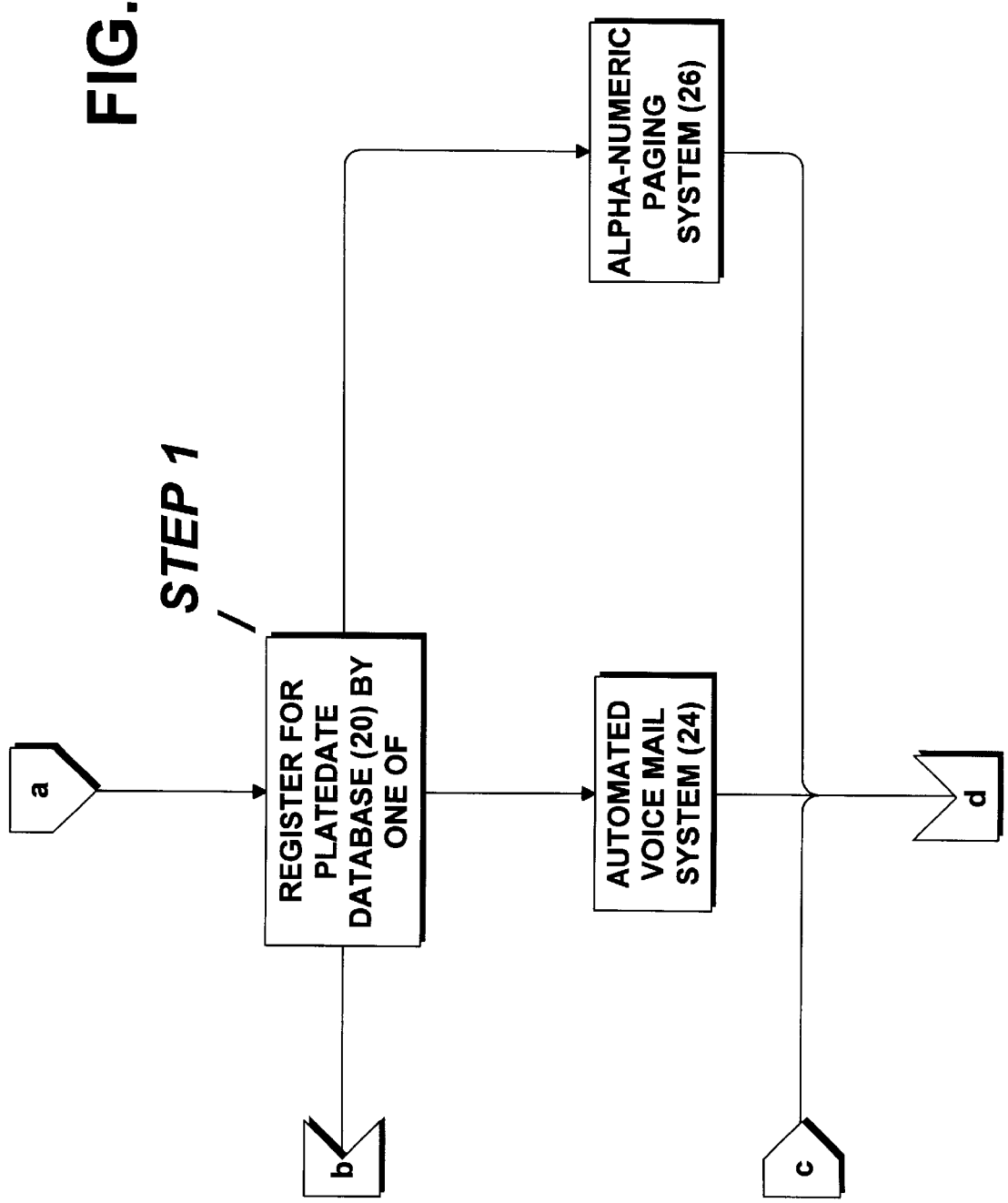

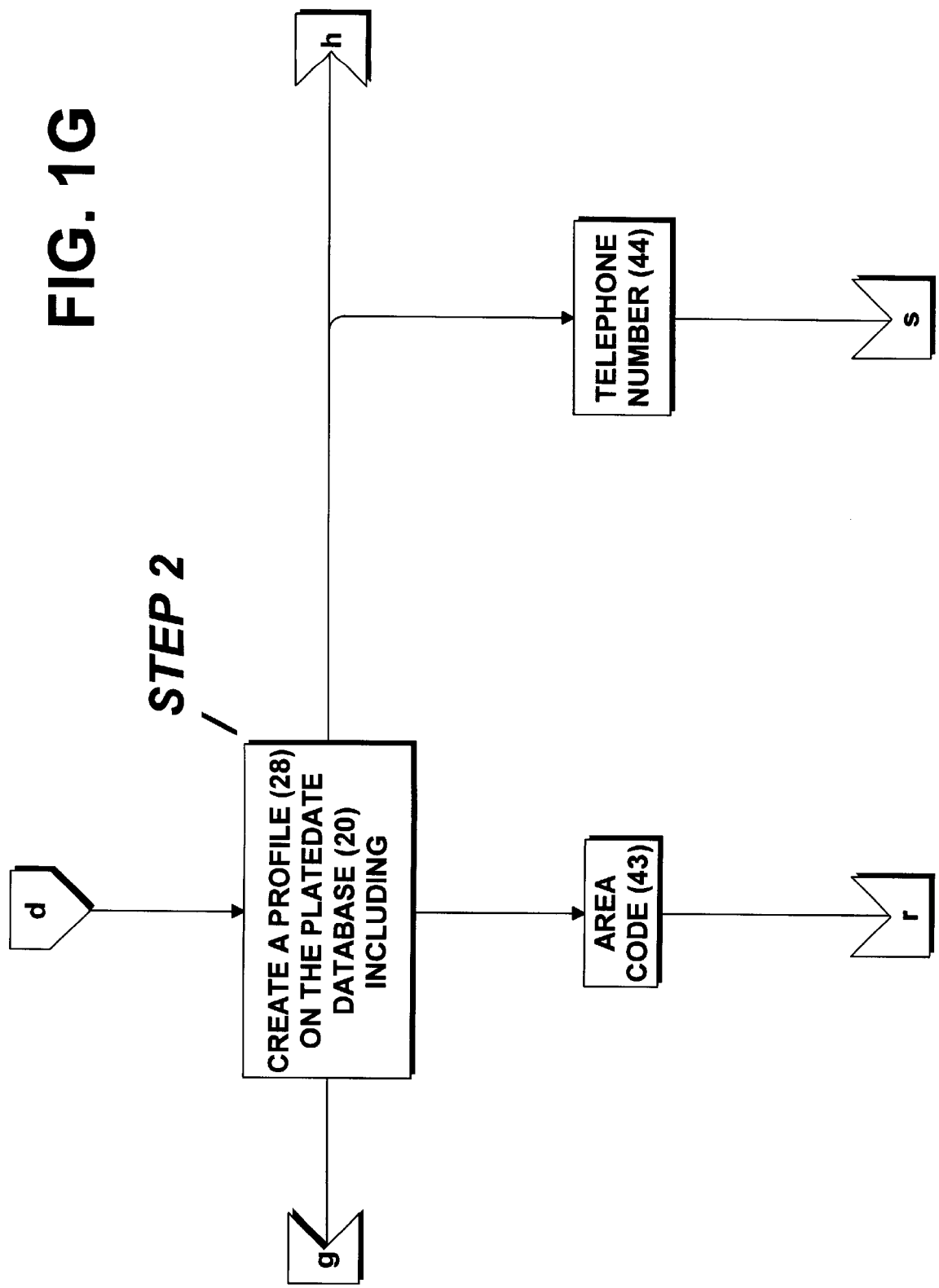

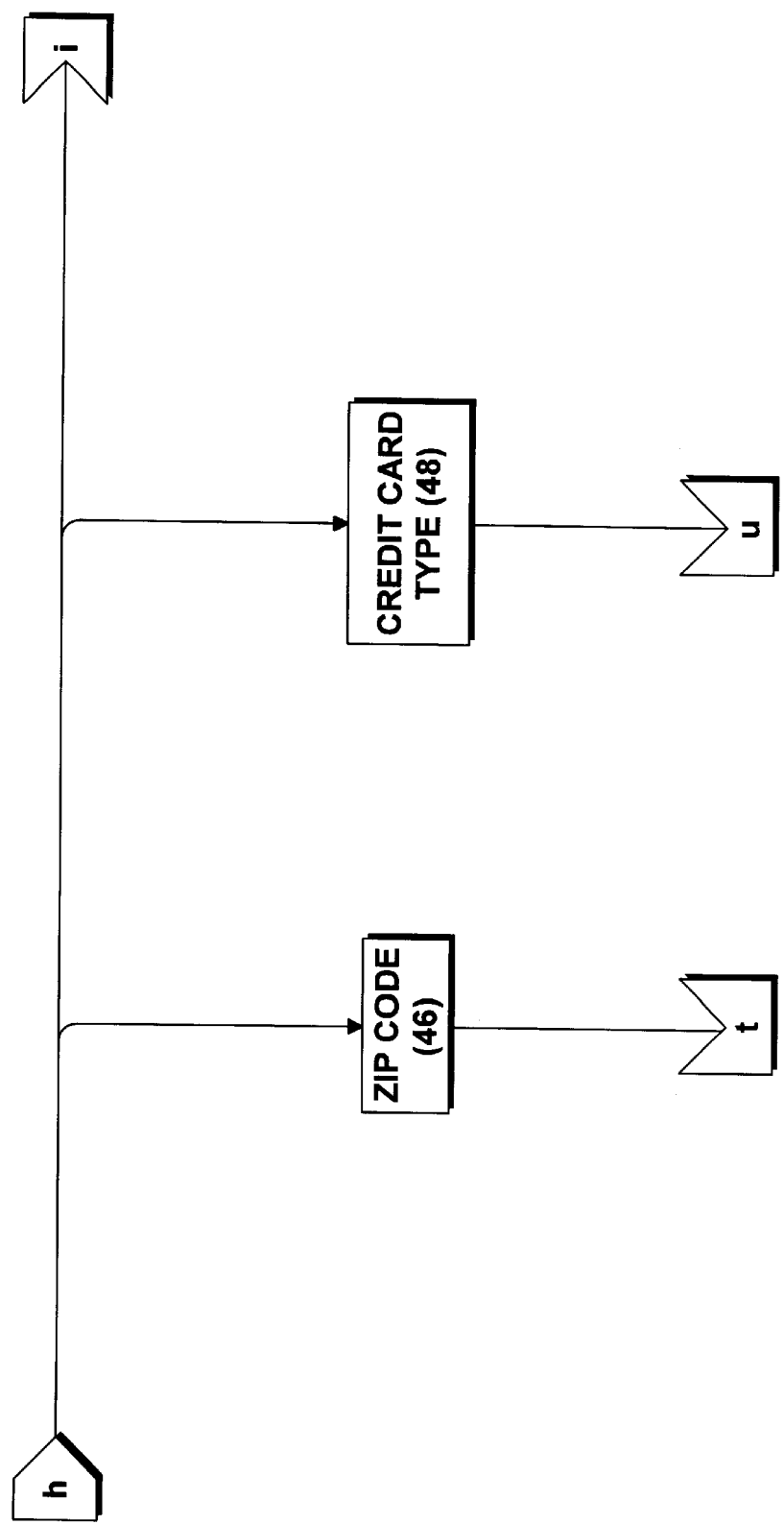

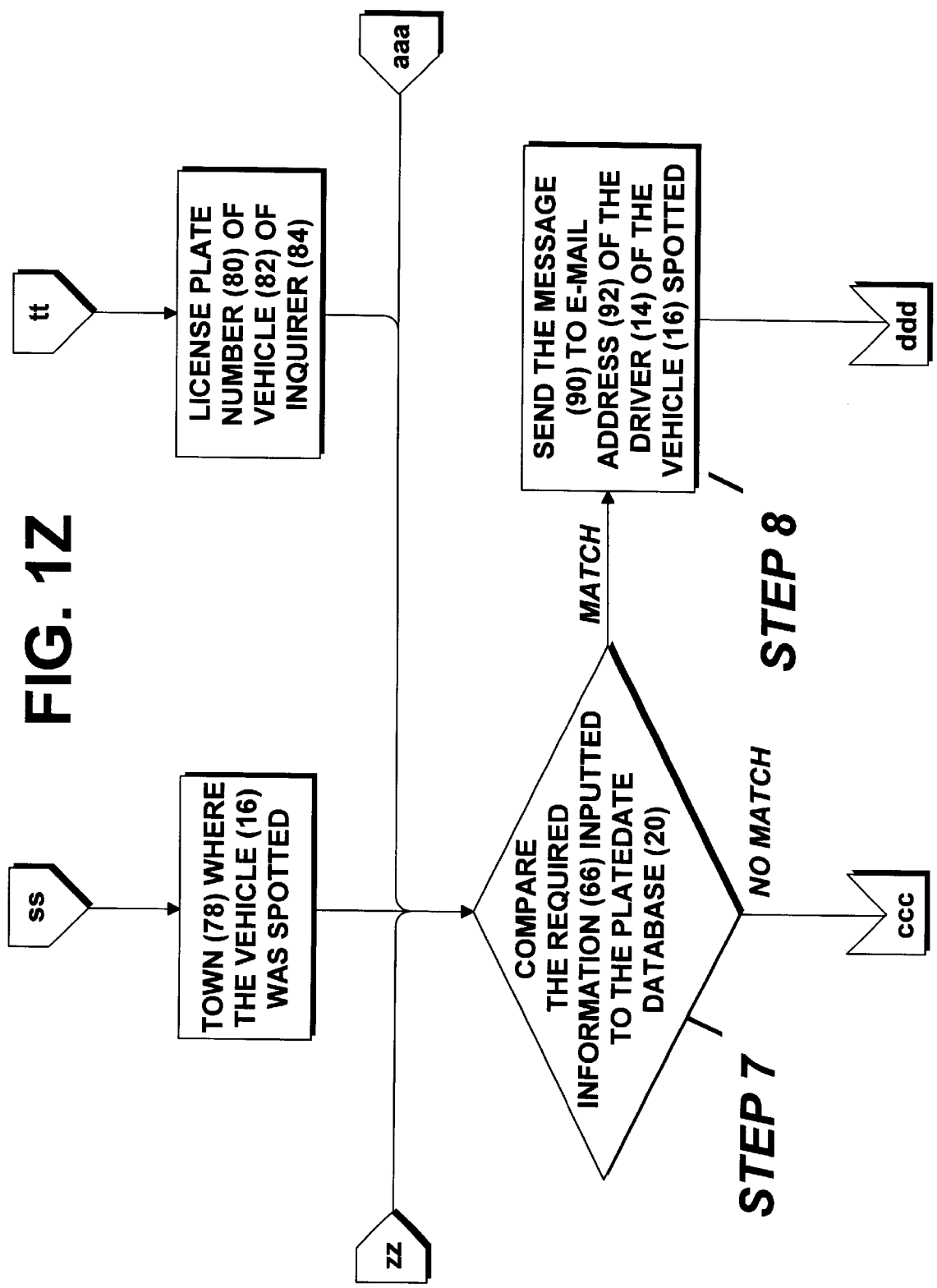

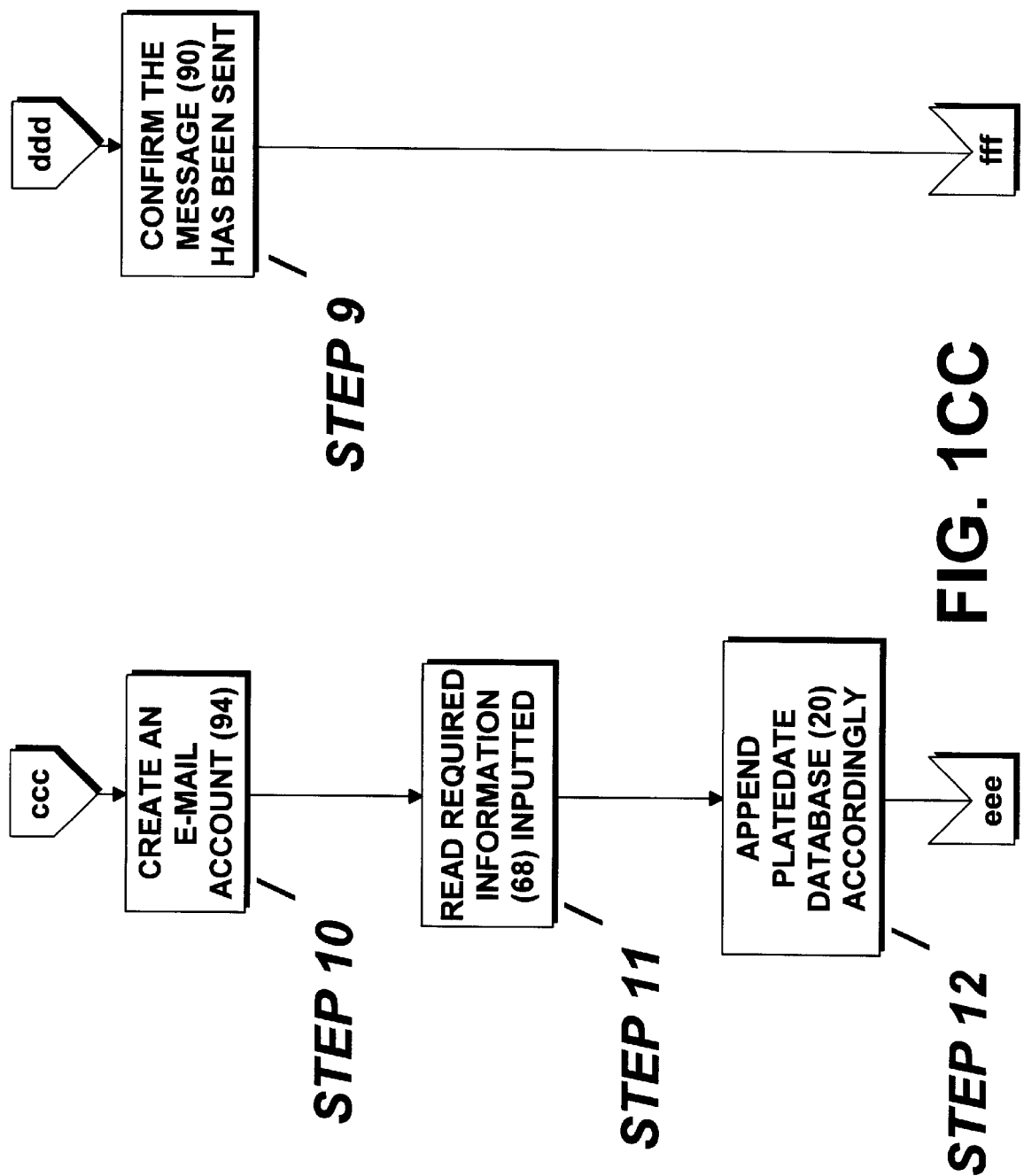

METHOD FOR REQUESTING A DATE WITH A DRIVER OF A VEHICLE SPOTTED, VIA THE LICENSE PLATE NUMBER OF THE VEHICLE

BACKGROUND OF THE INVENTION

1. Field of the Invention

The present invention relates to a method for requesting a date. More particularly, the present invention relates to a method for requesting a date with a driver of a vehicle spotted, via the license plate number of the vehicle.

2. Description of the Prior Art

Numerous innovations for communication systems have been provided in the prior art that will be described. Even though these innovations may be suitable for the specific individual purposes to which they address, however, they differ from the present invention in that they do not teach a method for requesting a date with a driver of a vehicle spotted, via the license plate number of the vehicle.

Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a method for requesting a date with a driver of a vehicle spotted, via the license plate number of the vehicle that avoids the disadvantages of the prior art.

Another object of the present invention is to provide a method for requesting a date with a driver of a vehicle spotted, via the license plate number of the vehicle that is simple and inexpensive to manufacture.

Still another object of the present invention is to provide a method for requesting a date with a driver of a vehicle spotted, via the license plate number of the vehicle that is simple to use.

Briefly stated, yet another object of the present invention is to provide a method for requesting a date with a driver of a vehicle spotted having a license plate number, via the license plate number of the vehicle. The method includes the steps of registering for a "PLATEDATE"™ database, creating a profile on the "PLATEDATE"™ database including license plate number, state vehicle is registered in, and E-mail address, spotting the vehicle whose driver you wish to date, accessing the "PLATEDATE"™ database, inputting required information including the license plate number of the vehicle spotted, state the vehicle spotted is registered in, license plate number of vehicle of inquirer, and state of the vehicle of the inquirer is registered in, comparing the required information inputted to the "PLATEDATE"™ database, sending the message to E-mail address of the driver of the vehicle spotted, if comparing step indicates a match, and creating an E-mail account, if comparing step indicates no match.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DETAILED DESCRIPTION OF THE PREFERRED EMBODIMENT

Figure 1A:
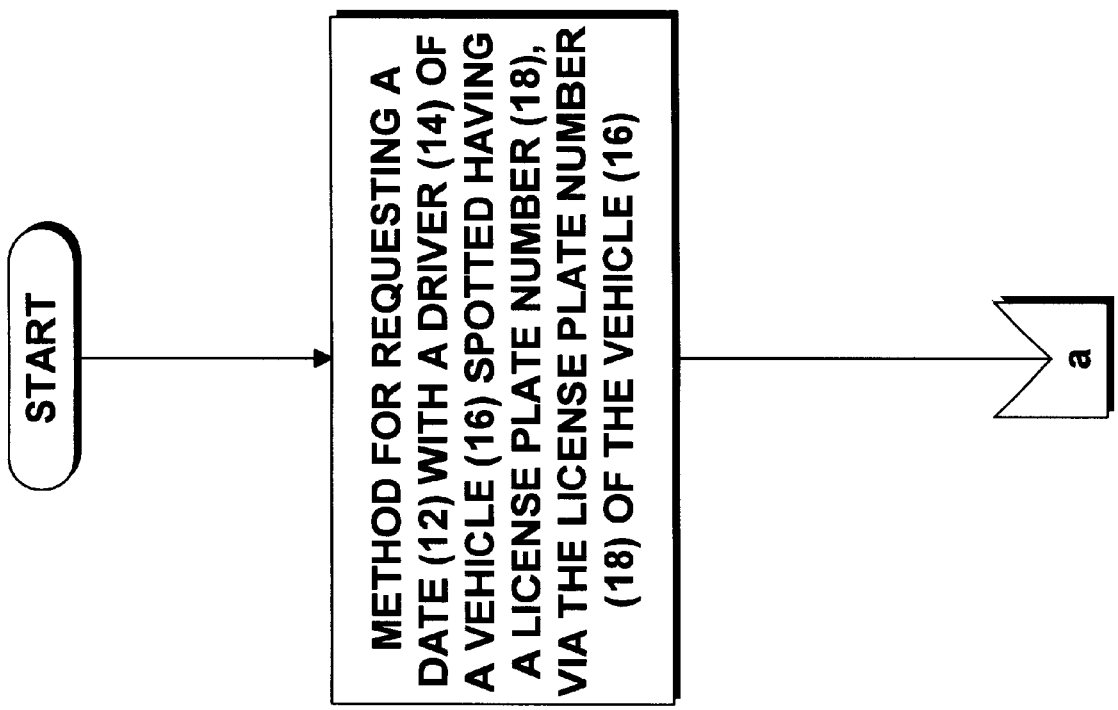
FIGS. 1A–1DD are a process flow chart of the present invention.
Figure 1B:
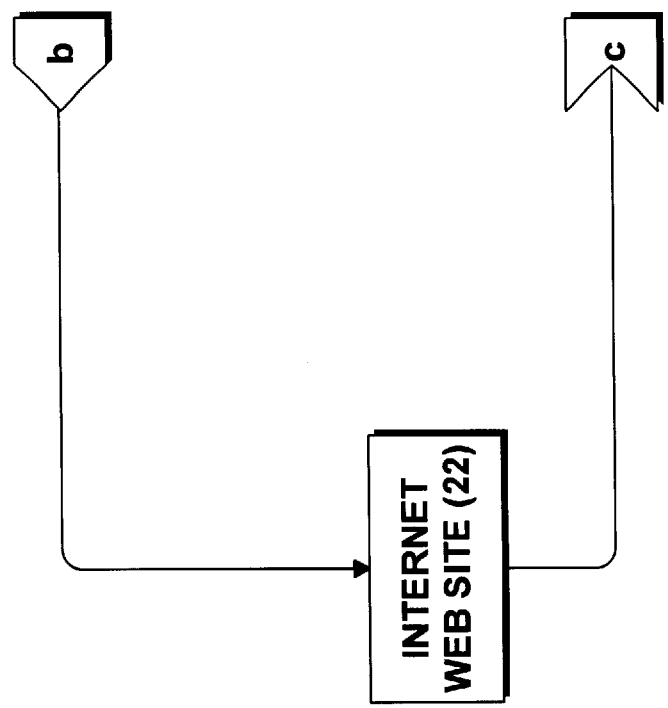
Figure 1D:
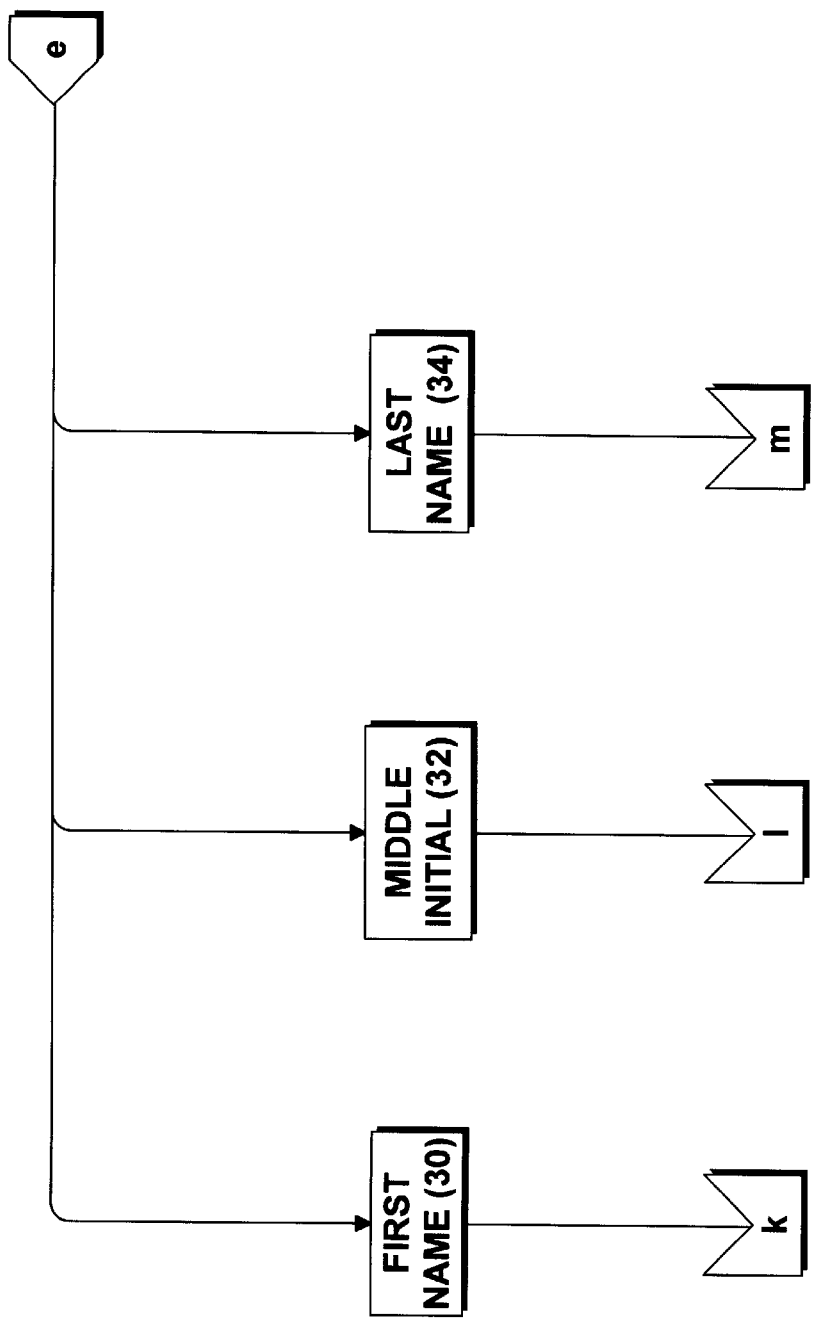
Figure 1E:
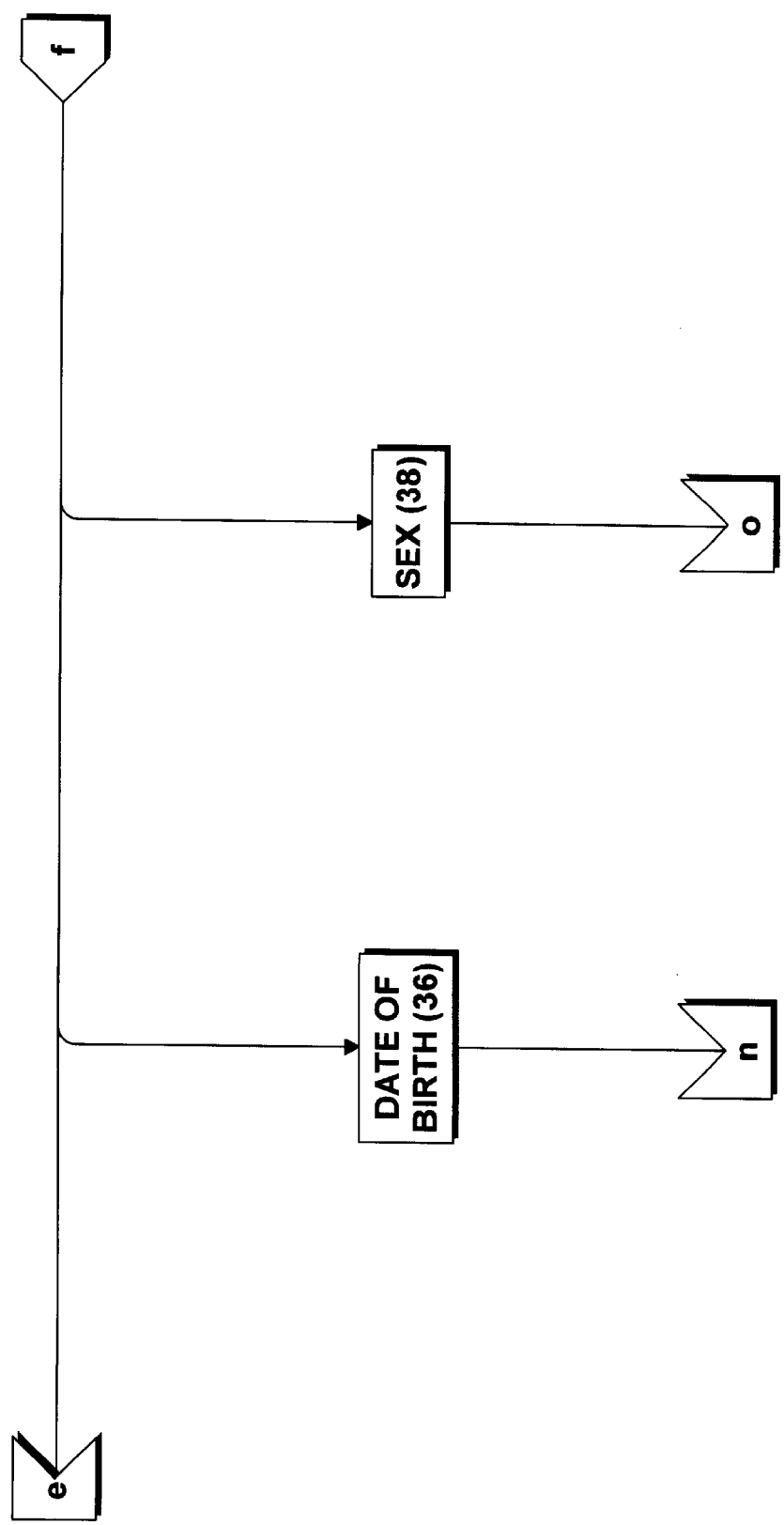
Figure 1F:
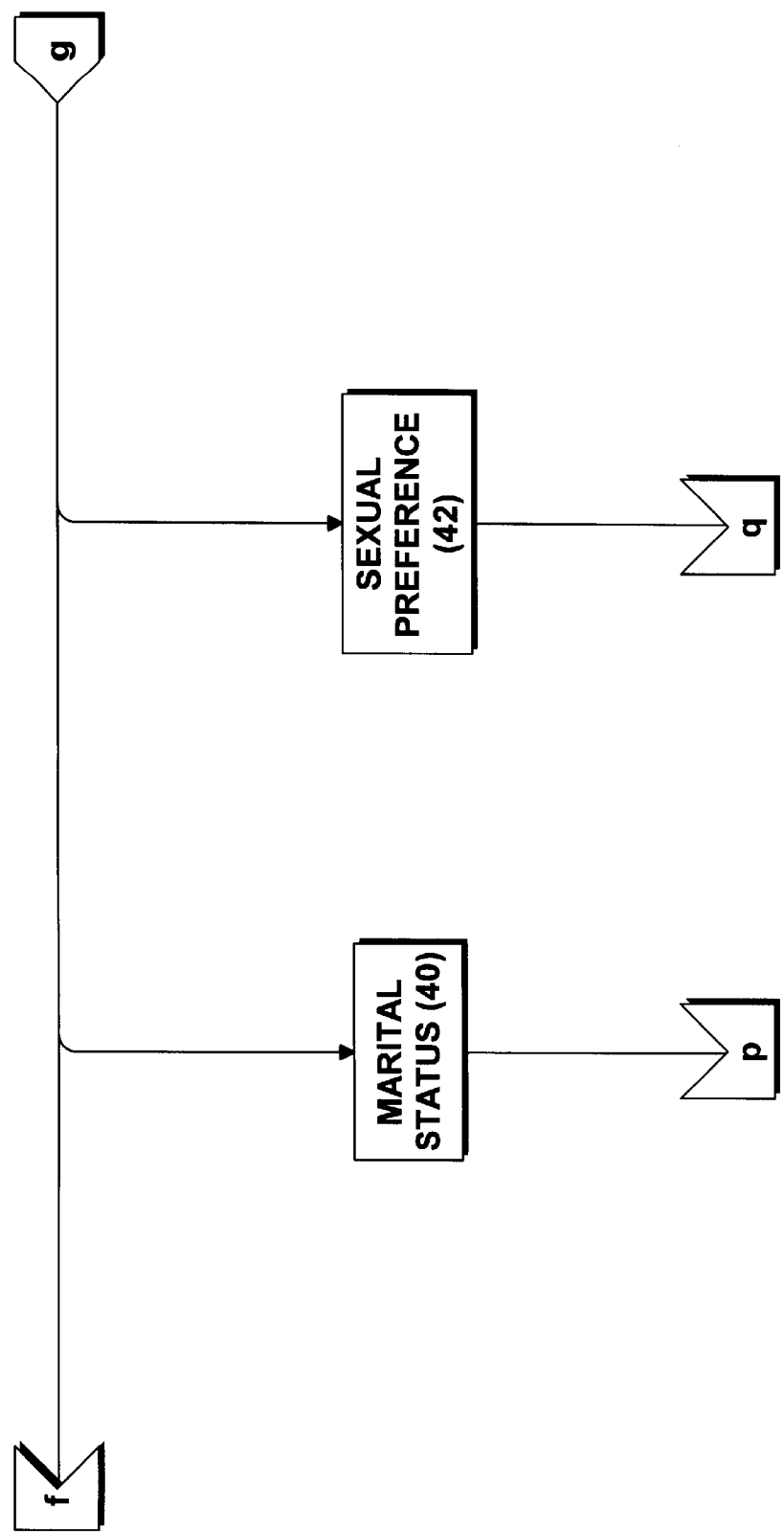
Figure 1I:
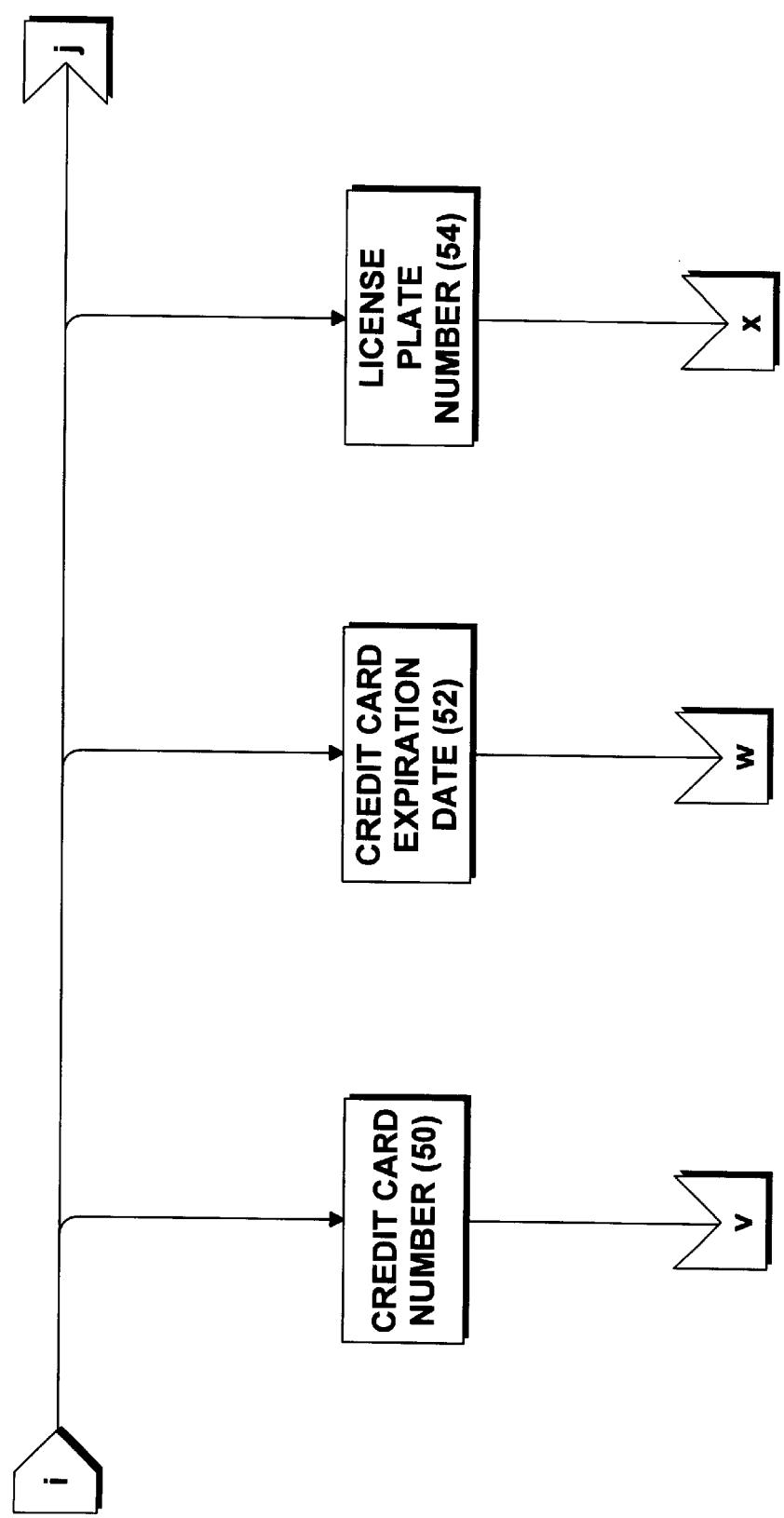
Figure 1J:
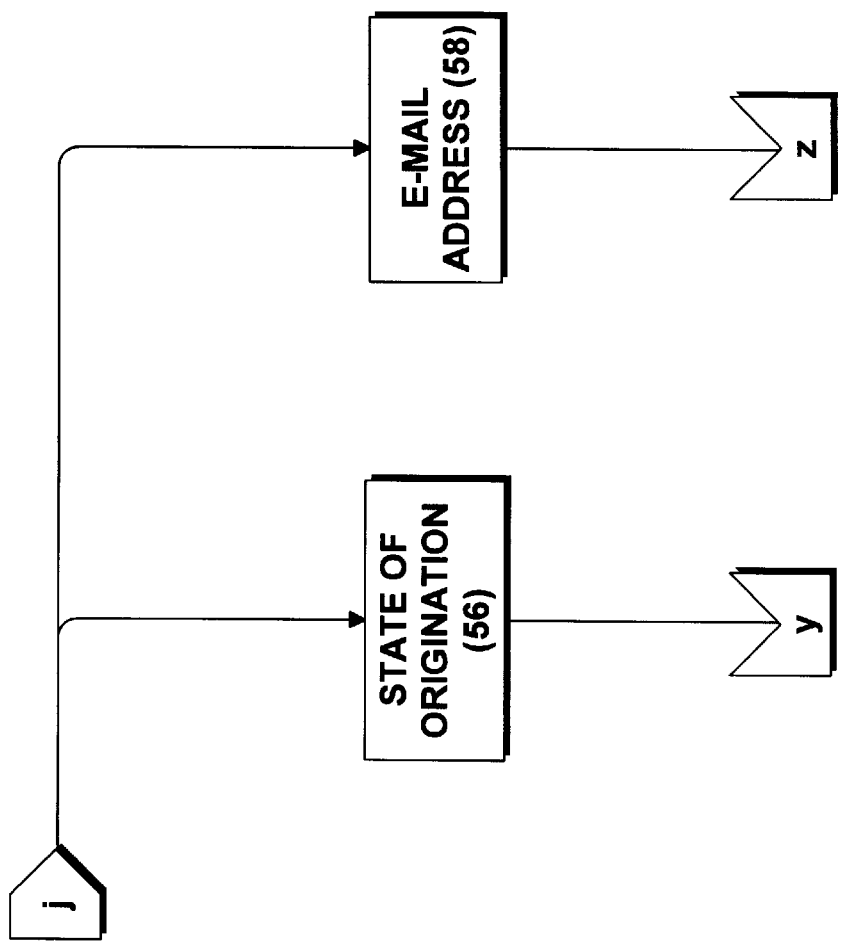
Figure 1K:
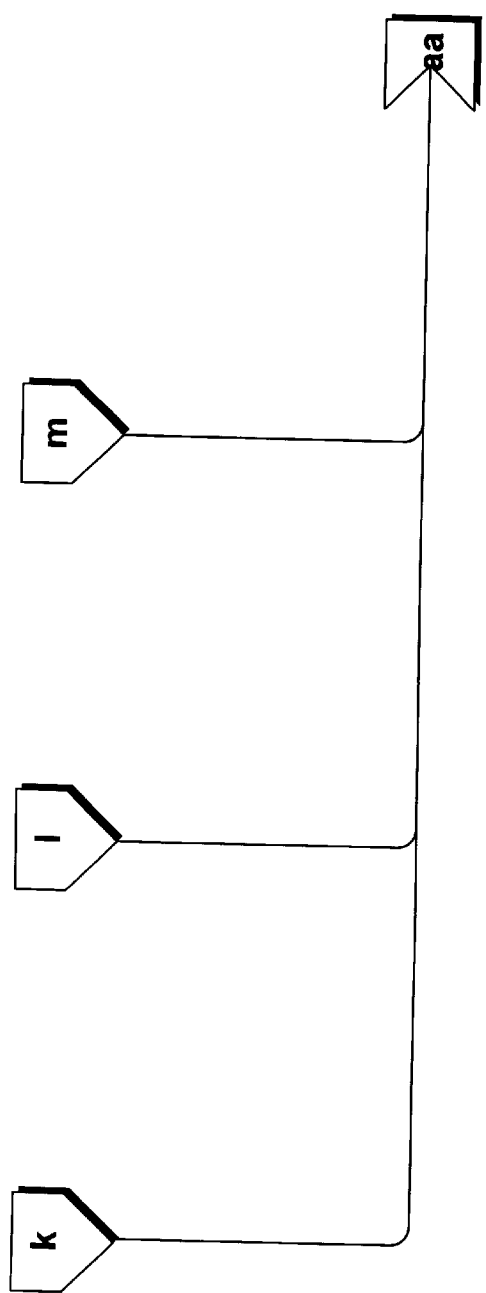
Figure 1L:
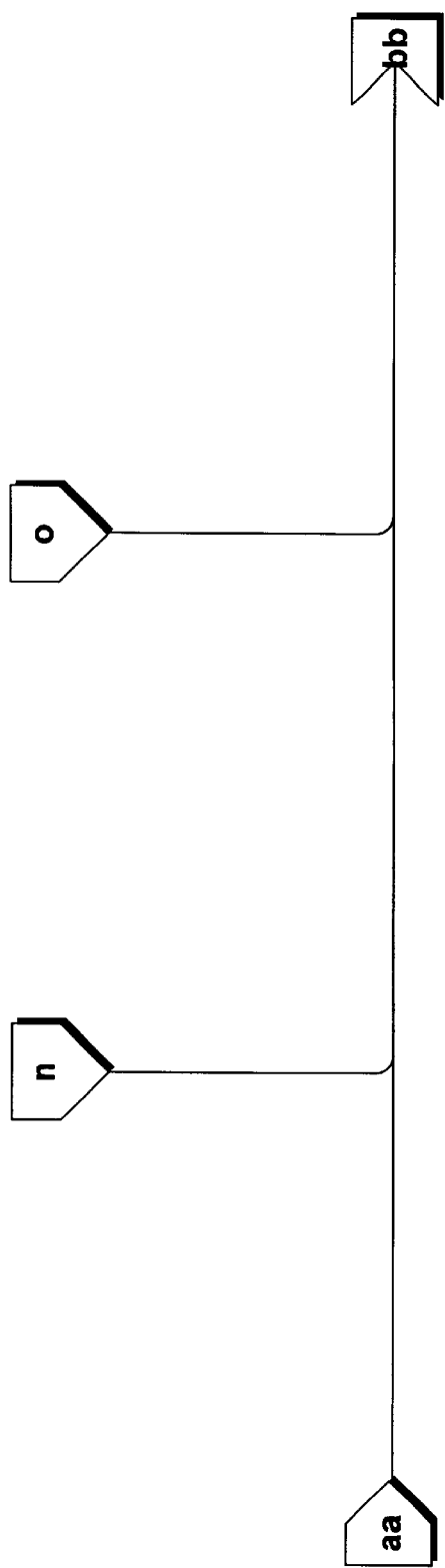
Figure 1M:
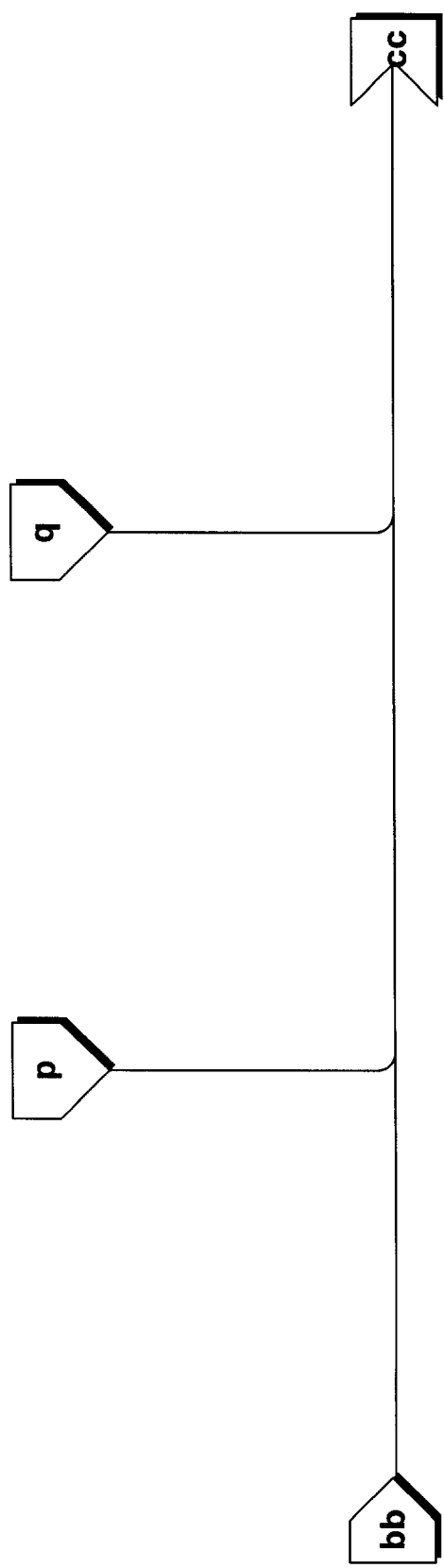
Figure 1N:
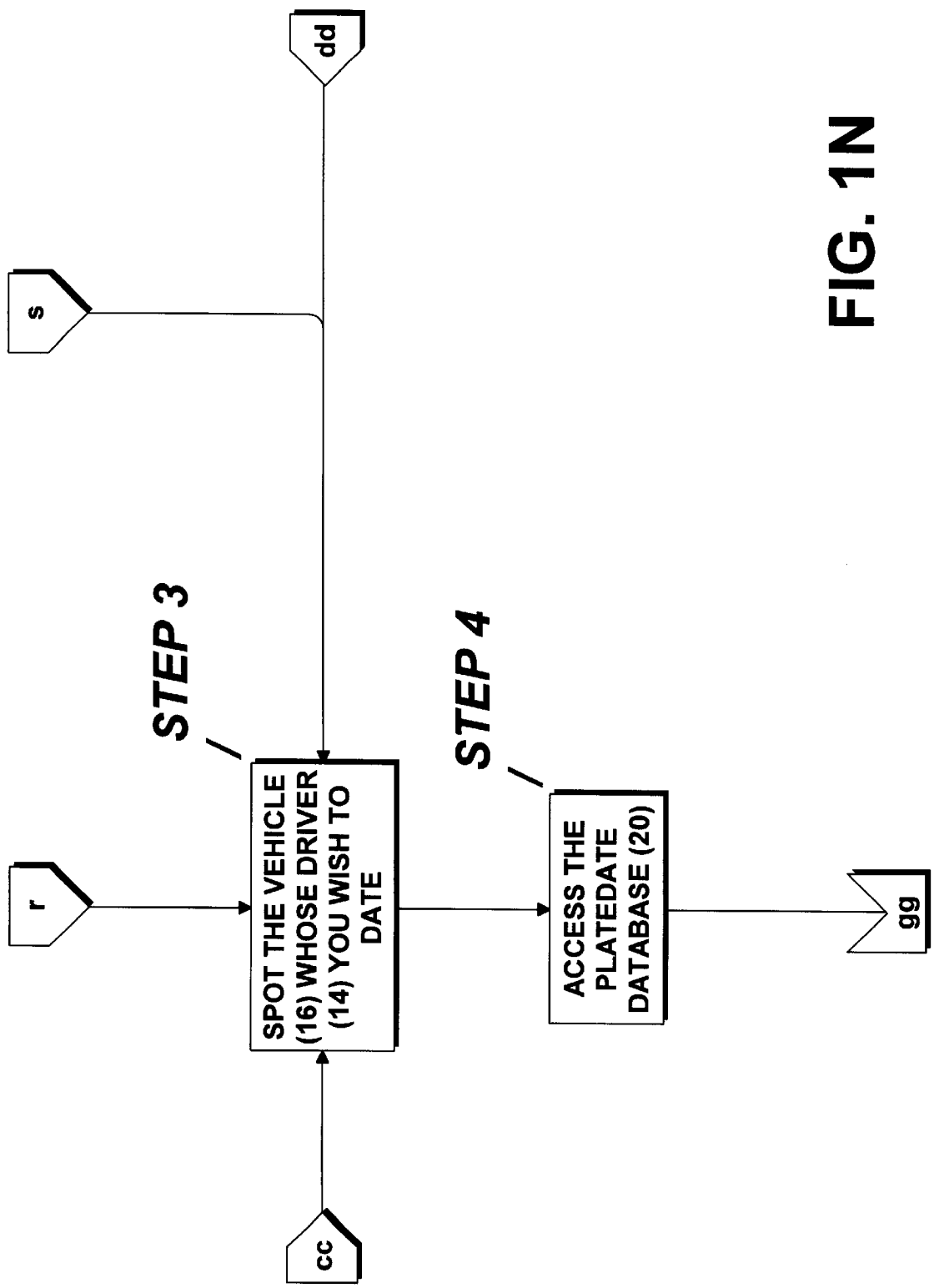
Figure 10:
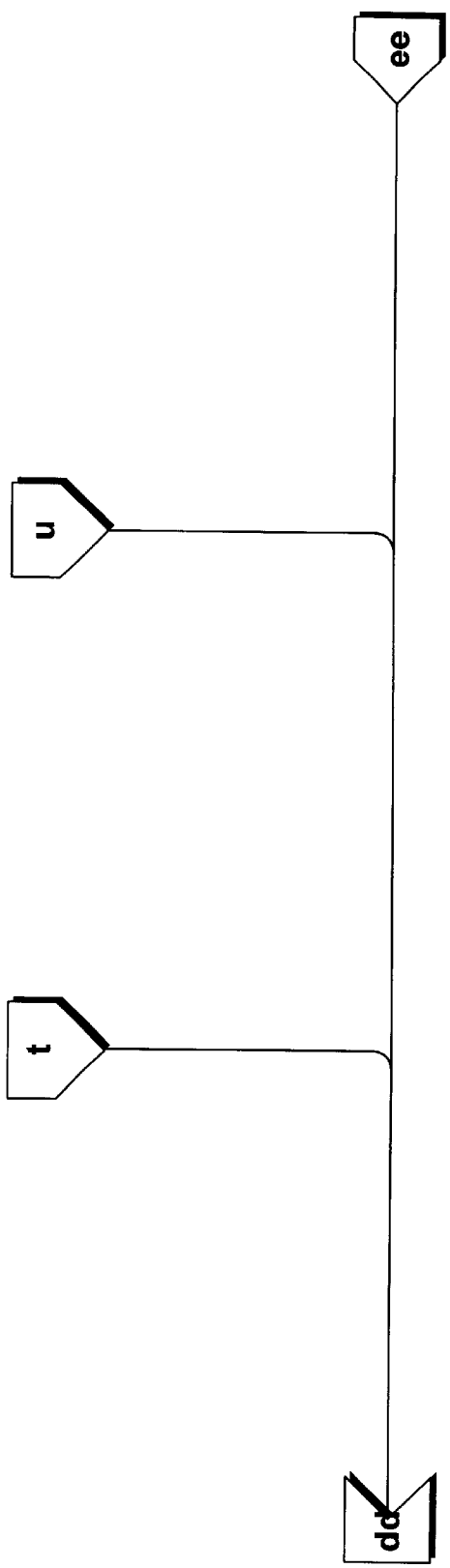
Figure 1P:
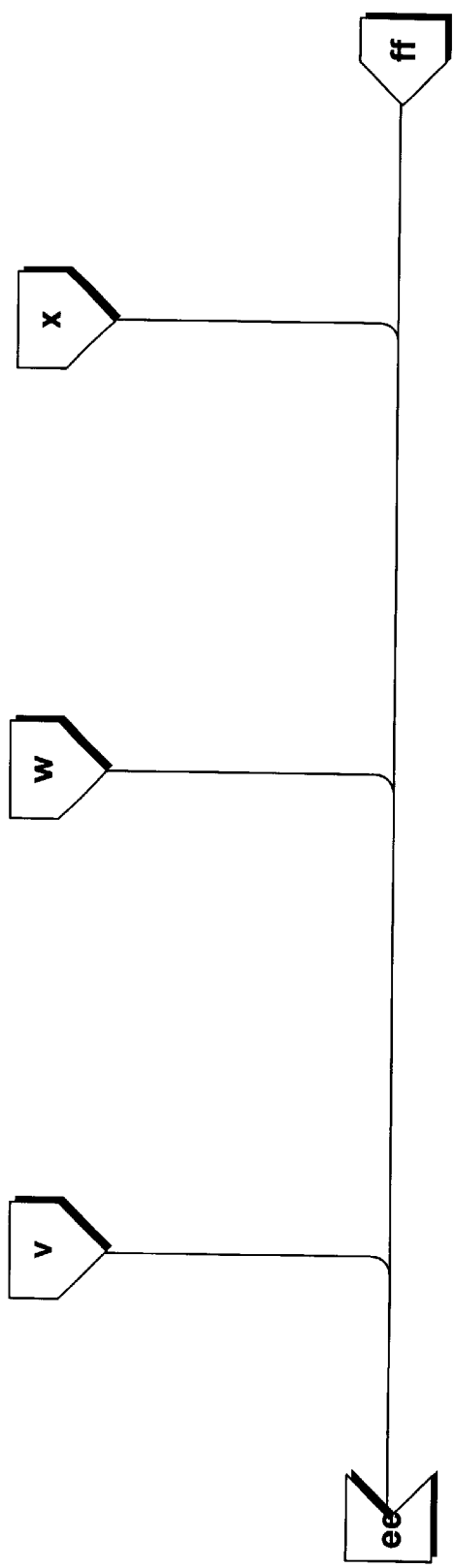
Figure 1Q:
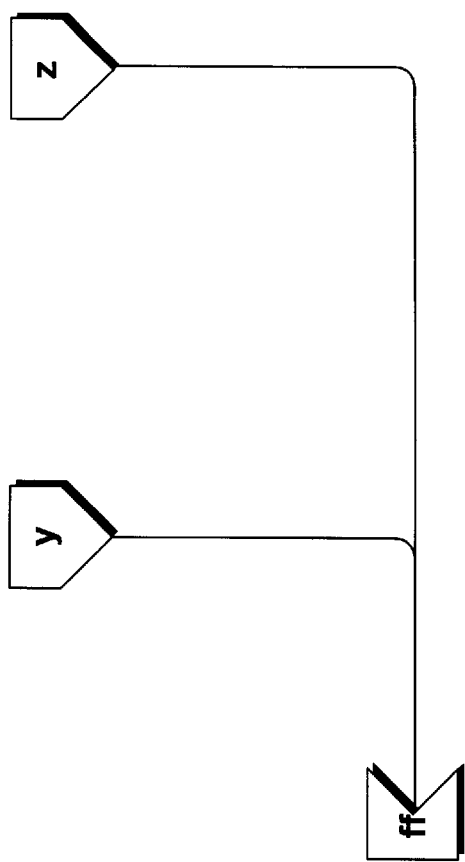
Figure 1R:
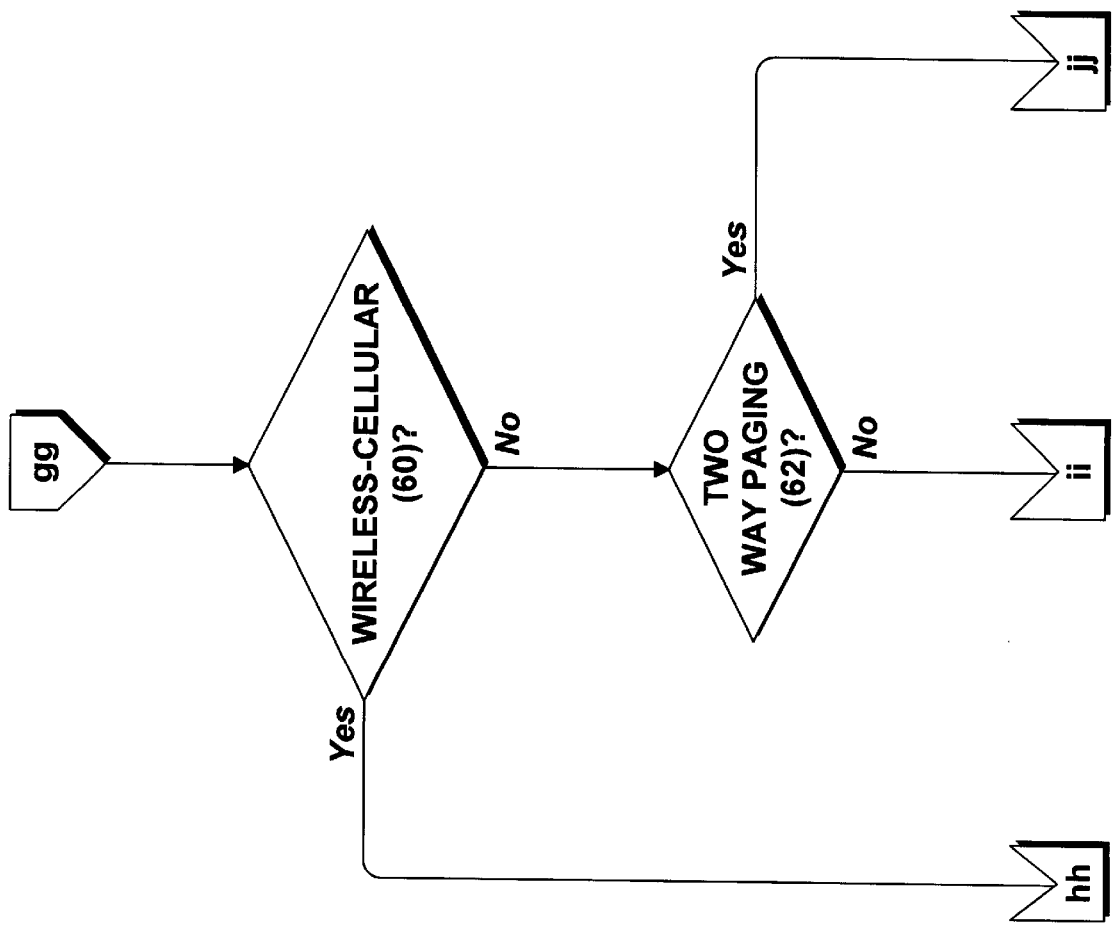
Figure 1S:
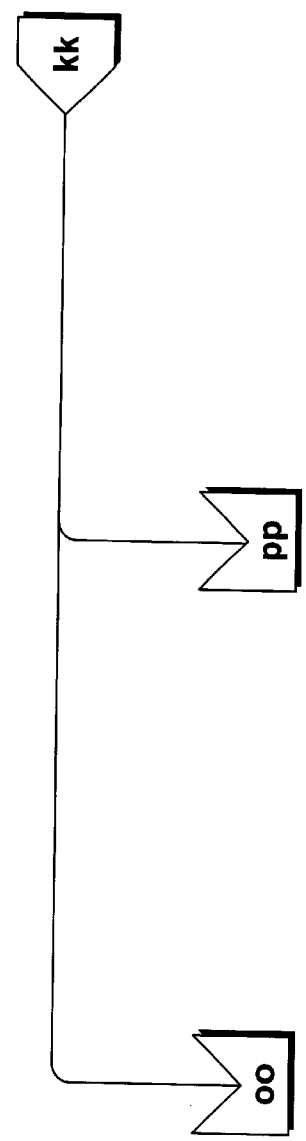
Figure 1T:
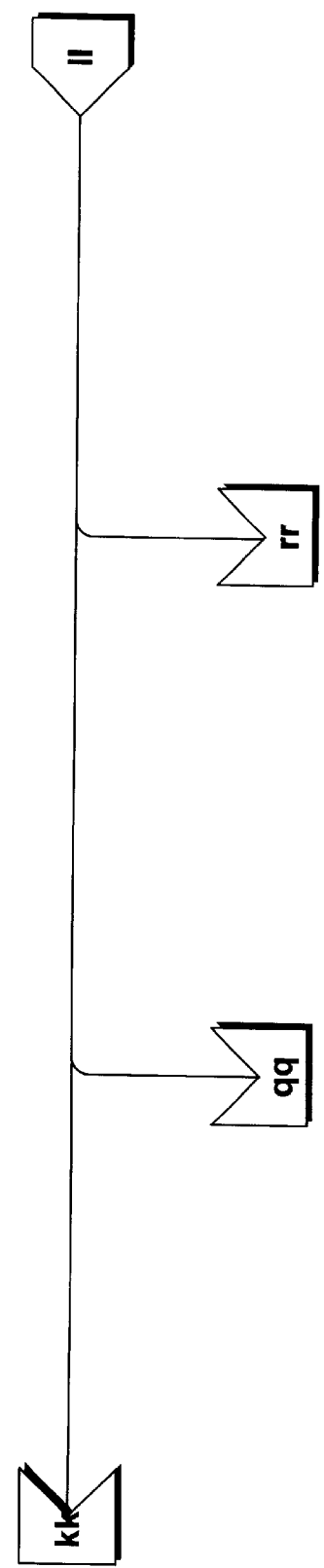
Figure 1U:
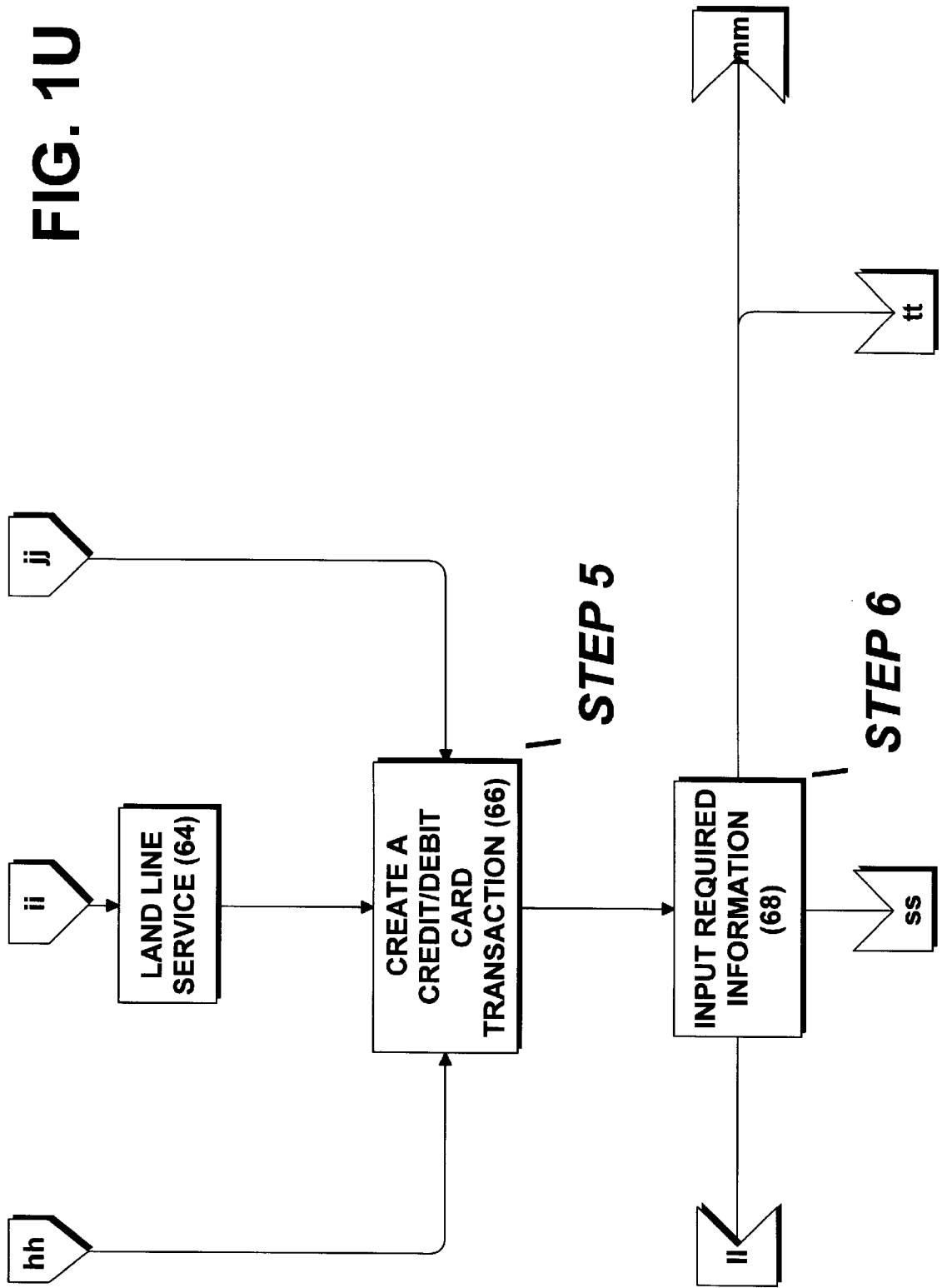
Figure 1V:
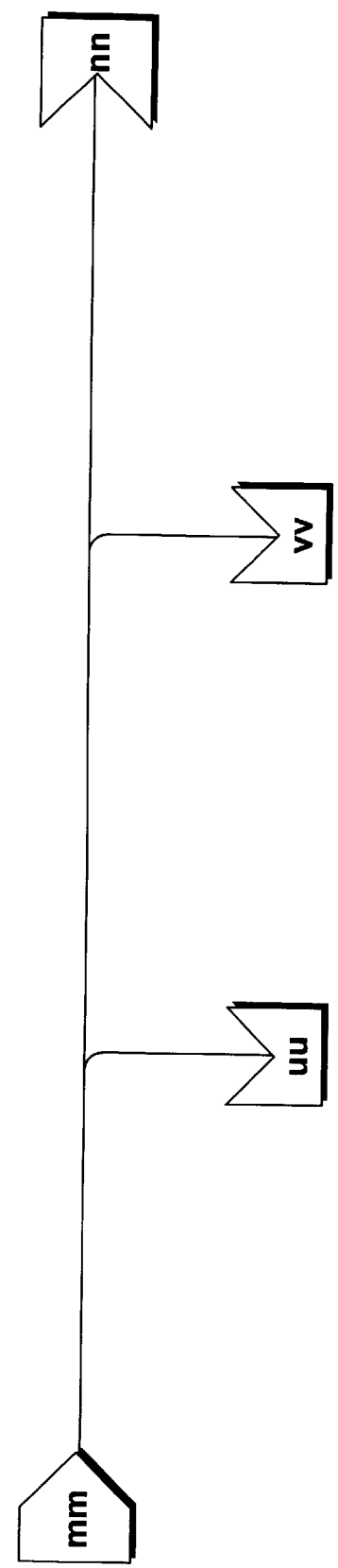
Figure 1W:
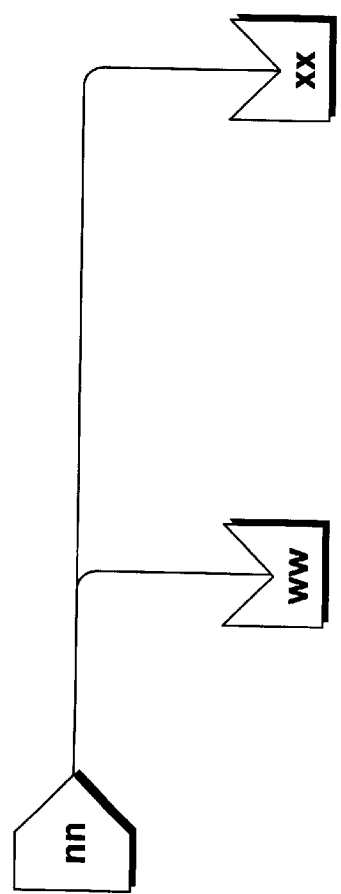
Figure 1X:
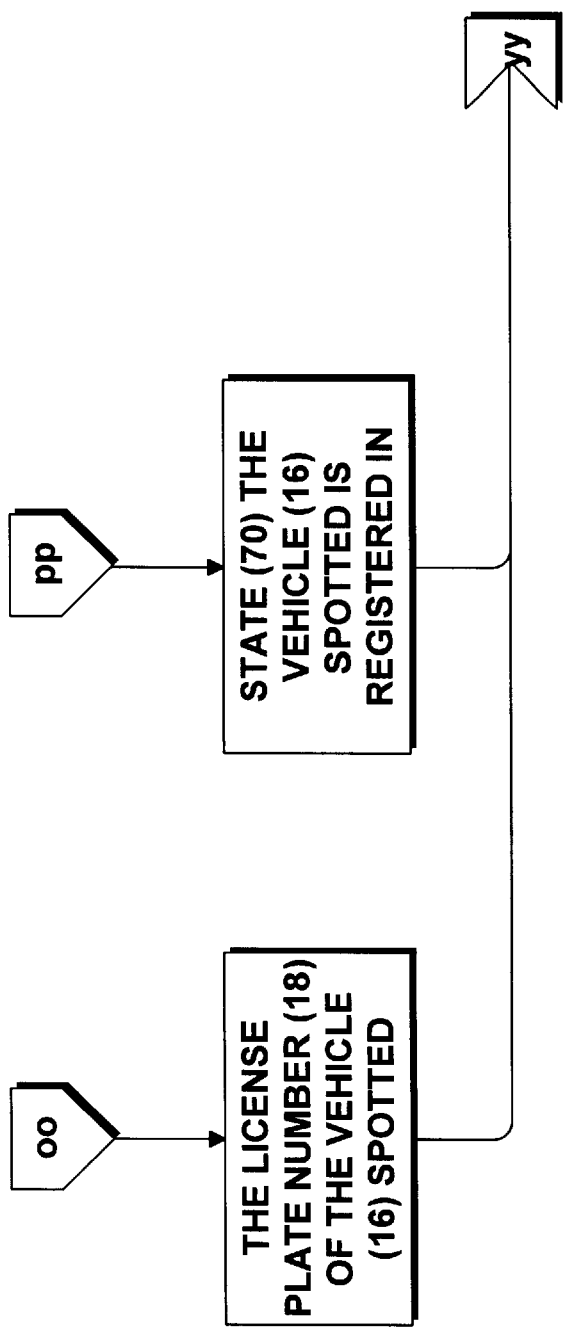
Figure 1Y:
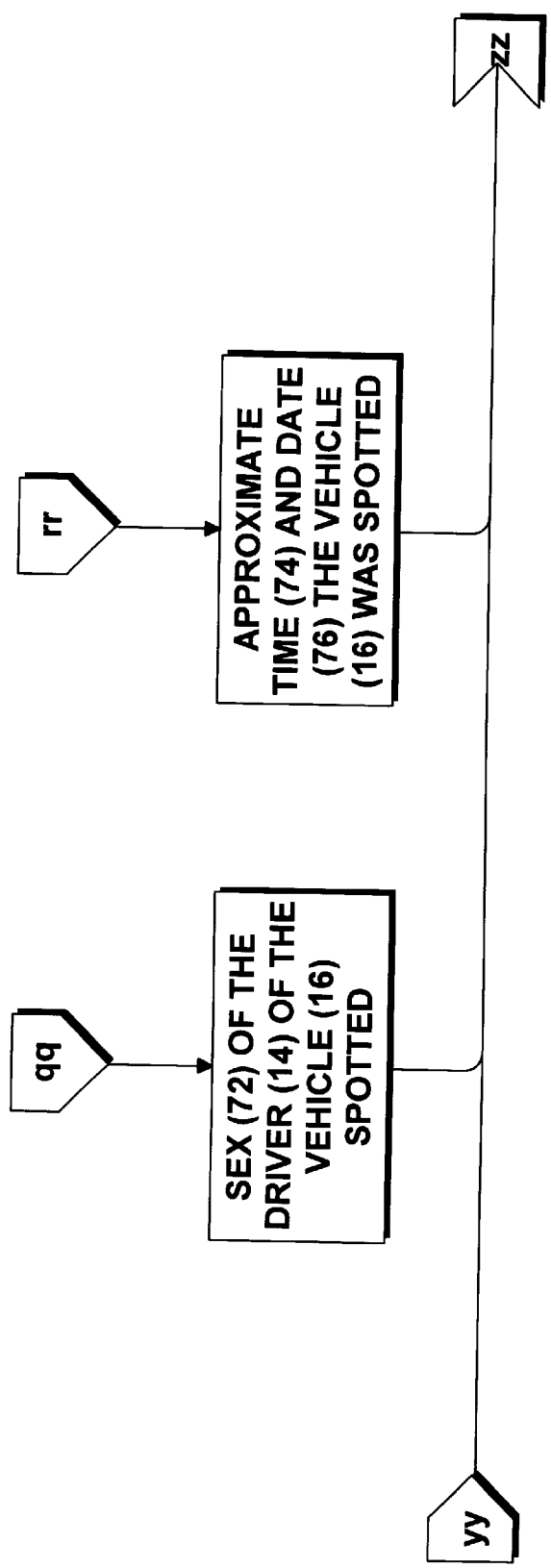
Figure 1A:
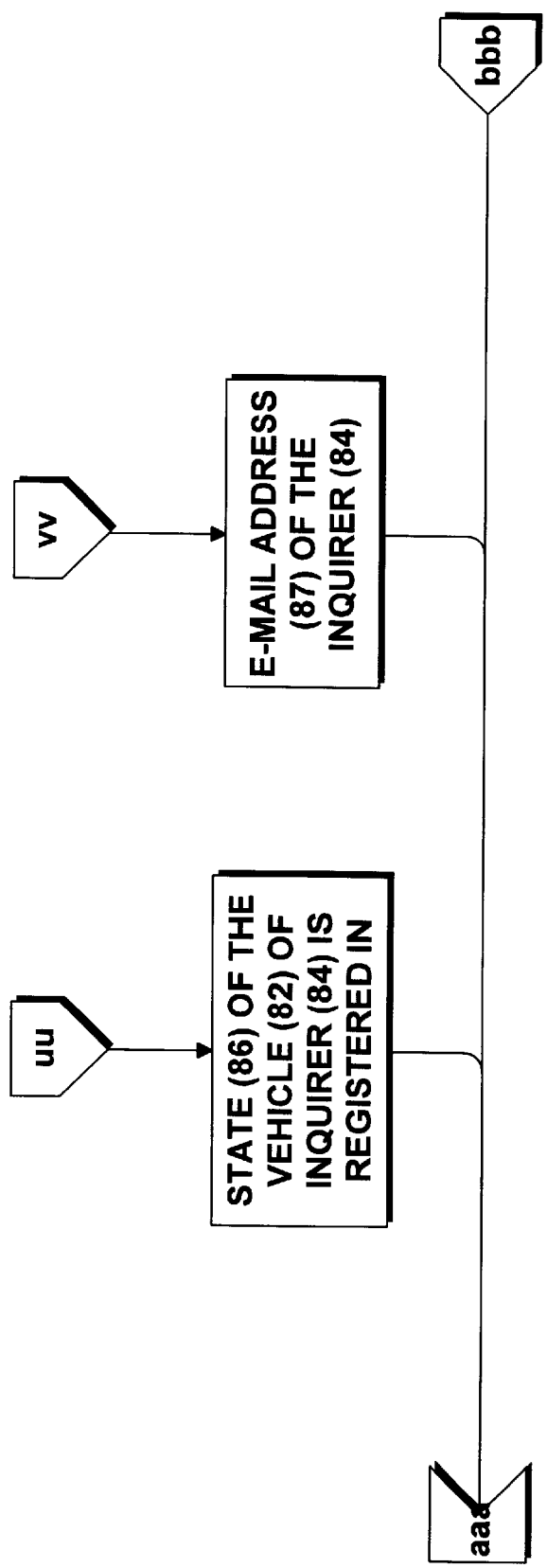
Figure 1B:
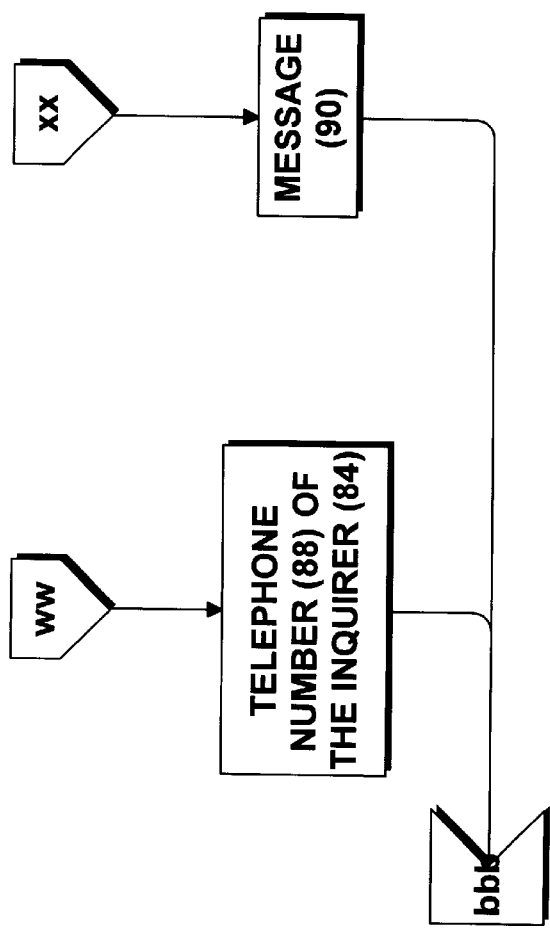
Figure 1D:
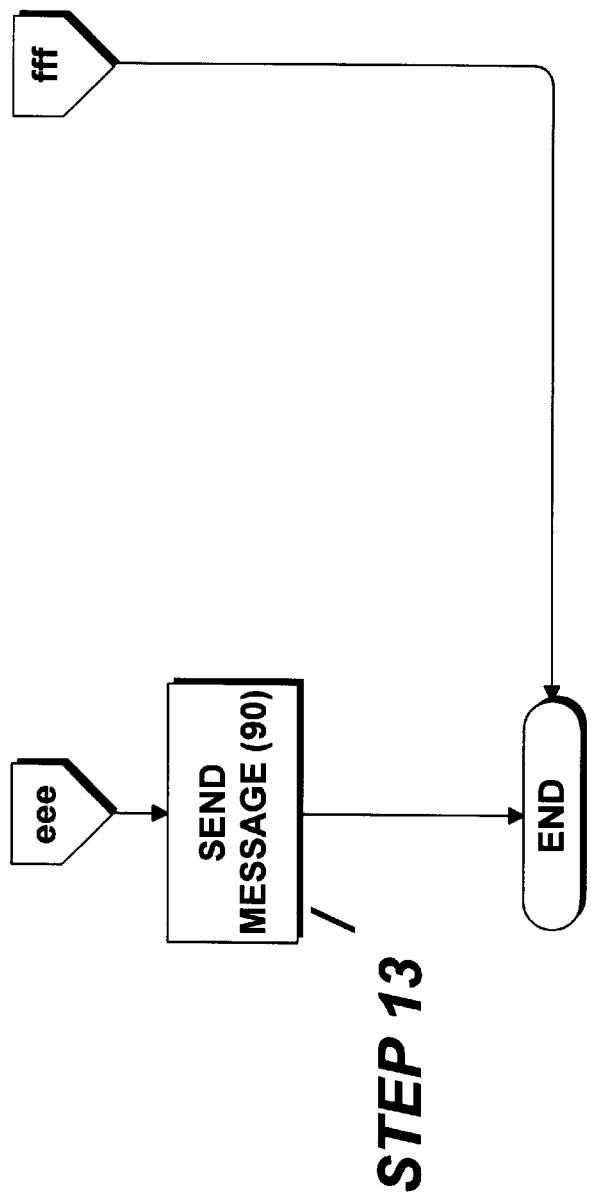

Referring now to the figures, in which like numerals indicate like parts, and particularly to FIGS. 1A–1DD, which are a process flow chart of the present invention, the method for requesting a date with a driver of a vehicle spotted, via the license plate number of the vehicle of the present invention is shown generally at 10 for requesting a date 12 with a driver 14 of a vehicle 16 spotted having a license plate number 18, via the license plate number 18 of the vehicle 16.

STEP 1: Register for "PLATEDATE"™ database 20 by one of internet web site 22, automated voice mail system 24, and alpha-numeric paging system 26. "PLATEDATE" is a trademark of Gary D. Wertheim.

STEP 2: Create a profile 28 on the "PLATEDATE"™ database 20 including first name 30, middle initial 32, last name 34, date of birth 36, sex 38, marital status 40, sexual preference 42, area code 43, telephone number 44, zip code 46, credit card type 48, credit card number 50, credit card expiration date 52, license plate number 54, state of origination 56, and E-mail address 58.

STEP 3: Spot the vehicle 16 whose driver 14 you wish to date.

STEP 4: Access the "PLATEDATE"™ database 20 by one of wireless-cellular 60, two way paging 62, and land line service 64.

STEP 5: Create a credit/debit card transaction 66.

STEP 6: Input required information 68 including the license plate number 18 of the vehicle 16 spotted, state 70 the vehicle 16 spotted is registered in, sex 72 of the driver 14 of the vehicle 16 spotted, approximate time 74 and date 76 the vehicle 16 was spotted, town 78 where the vehicle 16 was spotted, license plate number 80 of vehicle 82 of inquirer 84, state 86 of the vehicle 82 of the inquirer 84 is registered in, E-mail address 87 of the inquirer 84, telephone number 88 of the inquirer 84, and message 90.

STEP 7: Compare the required information 66 in putted to the "PLATEDATE"™ database 20.

STEP 8: Send the message 90 to E-mail address 92 of the driver 14 of the vehicle 16 spotted, if STEP 6 indicates a match.

STEP 9: Confirm the message 90 has been sent.

STEP 10: Create an E-mail account 94, if STEP 6 indicates no match.

STEP 11: Read required information 68 inputted.

STEP 12: Append the "PLATEDATE"™ database 20 accordingly.

STEP 13: Send the message 90.

It will be understood that each of the elements described above, or two or more together, may also find a useful application in other types of constructions differing from the types described above.

While the invention has been illustrated and described as embodied in a method of requesting a date with a driver of a vehicle spotted, via the license plate number of the vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

LIST OF REFERENCE NUMERALS UTILIZED IN THE DRAWING 10 method for requesting a date with a driver of a vehicle spotted, via the license plate number of the vehicle of the present invention
12 date
14 driver of vehicle 16
16 vehicle
18 license plate number of vehicle 16
20 "PLATEDATE"™ database
22 internet web site
24 automated voice mail system
26 alpha-numeric paging system
28 profile on "PLATEDATE"™ database 20
30 first name in profile 28 on "PLATEDATE"™ database 20
32 middle initial in profile 28 on "PLATEDATE"™ database 20
34 last name in profile 28 on "PLATEDATE"™ database 20
36 date of birth in profile 28 on "PLATEDATE"™ database 20
38 sex in profile 28 on "PLATEDATE"™ database 20
40 marital status in profile 28 on "PLATEDATE"™ database 20
42 sexual preference in profile 28 on "PLATEDATE"™ database 20
43 area code in profile 28 on "PLATEDATE"™ database 20
44 telephone number in profile 28 on "PLATEDATE"™ database 20
46 zip code in profile 28 on "PLATEDATE"™ database 20
48 credit card type in profile 28 on "PLATEDATE"™ database 20
50 credit card number in profile 28 on "PLATEDATE"™ database 20
52 credit card expiration date in profile 28 on "PLATEDATE"™ database 20
54 license plate number in profile 28 on "PLATEDATE"™ database 20
56 state of origination in profile 28 on "PLATEDATE"™ database 20
58 E-mail address in profile 28 on "PLATEDATE"™ database 20
60 wireless-cellular
62 two way paging
64 land line service
66 credit/debit card transaction
68 required information
70 state vehicle 16 spotted is registered in of required information 68
72 sex of driver of vehicle 16 spotted of required information 68
74 approximate time vehicle 16 was spotted of required information 68
76 date vehicle 16 was spotted of required information 68
78 town where vehicle 16 was spotted of required information 68
80 license plate number of vehicle 82 of inquirer 84 of required information 68
82 vehicle of inquirer 84
84 inquirer
86 state of vehicle of inquirer 84 is registered in of required information 68
87 E-mail address of inquirer 84 of required information 68
88 telephone number of inquirer 84 of required information 68
90 message of required information 68
92 E-mail address of driver 14 of vehicle 16 spotted
94 E-mail account

The invention claimed is:

1. A method for requesting a date with a driver of a vehicle spotted having a license plate number, via the license plate number of the vehicle, comprising the steps of:

a) registering for a database;

b) creating a profile on said database including license plate number, state vehicle is registered in, E-mail address, state of origination, first name, middle initial, last name, date of birth, sex, marital status, sexual preference, area code, telephone number, zip code, credit card type, credit card number, and credit card expiration date;

c) spotting the vehicle whose driver you wish to date;

d) accessing said database;

e) inputting required information including the license plate number of the vehicle spotted, state the vehicle spotted is registered in, license plate number of vehicle of inquirer, state of the vehicle of the inquirer is registered in, E-mail address of inquirer, sex of the driver of the vehicle spotted, approximate time and date the vehicle was spotted, town where the vehicle was spotted, telephone number of the inquirer, and a message;

f) comparing said required information inputted to said database; and g) sending said message to E-mail address of the driver of the vehicle spotted, if step f) indicates a match.

2. The method as defined in claim 1, wherein said step of registering for a database includes registering for a database by an internet web site.

3. The method as defined in claim 1, wherein said step of registering for a database includes registering for a database by an automated voice mail system.

4. The method as defined in claim 1, wherein said step of registering for a database includes registering for a database by an alpha-numeric paging system.

5. The method as defined in claim 1, wherein said step of accessing said database includes accessing said database by wireless-cellular.

6. The method as defined in claim 1, wherein said step of accessing said database includes accessing said database by two way paging.

7. The method as defined in claim 1, wherein said step of accessing said database includes accessing said database by land line service.

8. The method as defined in claim 1; further comprising the step of creating a credit/debit card transaction.

9. The method as defined in claim 1; further comprising the step of confirming said message has been sent.

* * * * *